United States Patent Office 3,348,469
Patented Oct. 24, 1967

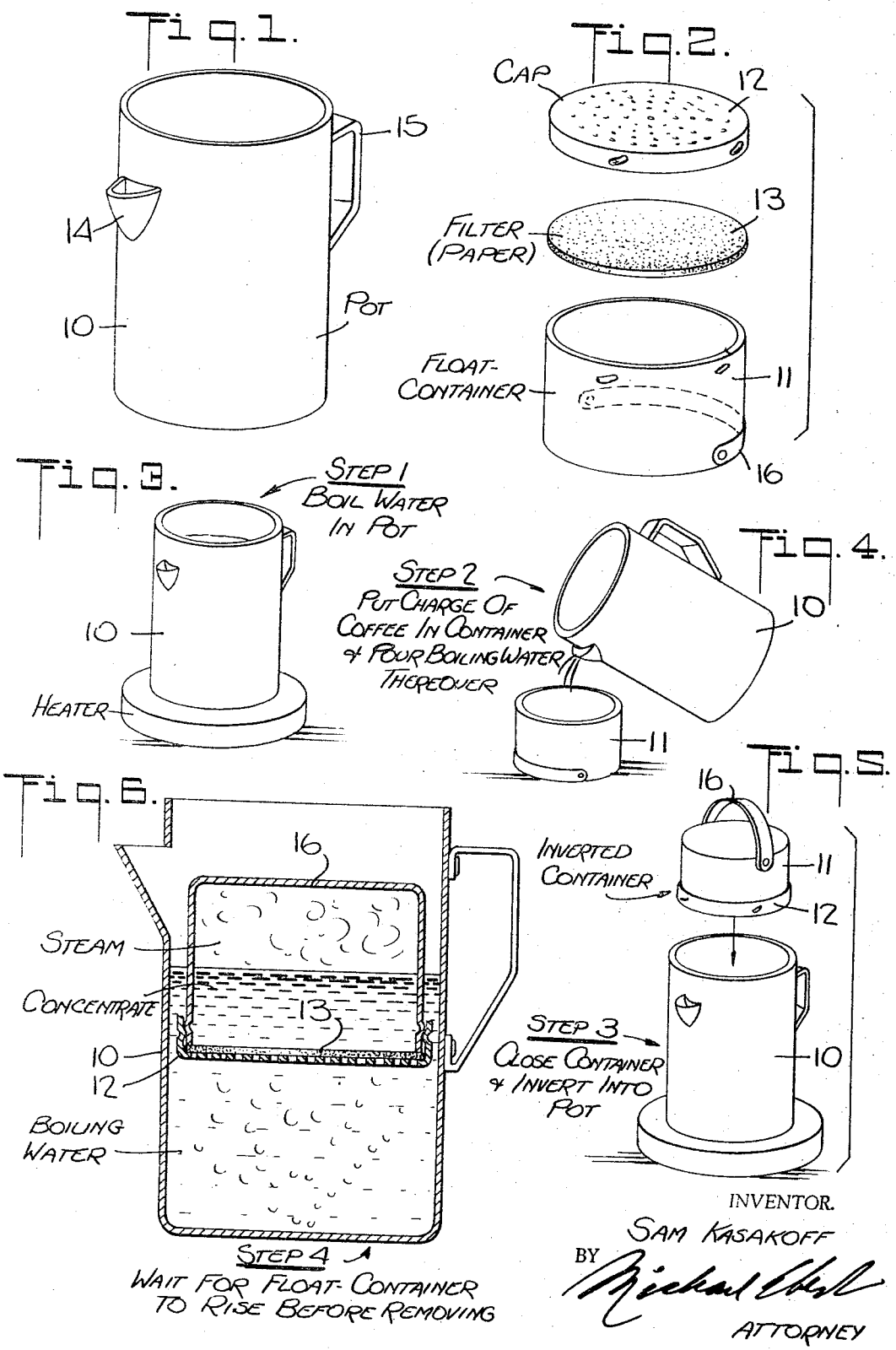

3,348,469
COFFEE MAKER
Sam Kasakoff, 329 E. 58th St., New York, N.Y. 10022
Filed Sept. 4, 1964, Ser. No. 394,420
3 Claims. (Cl. 99—320)

This invention relates generally to coffee makers, and more particularly to an improved coffee maker which quickly and efficiently brews ground coffee to produce a beverage of high quality.

Coffee beans must be carefully roasted before they are ready for the consumer. Roasted coffee contains about 1 to 2% of the alkaloid caffein which acts as a cerebral stimulant. While coffee contains glucose, dextrin and protein, its aroma is due primarily to an oily substance, known as caffeol, which quickly oxidizes when exposed to air. It is for this reason that modern vacuum packaging techniques are used to preserve the flavor of coffee.

Various techniques are currently used to brew coffee. The simplest technique is the so-called pot method, wherein the ground coffee is deposited in a pot of boiling water which is allowed to steep until a liquid of the proper concentration is produced. The drawback to this method is that one must wait until the coffee grounds settle, otherwise the grounds and the liquid are intermingled and the beverage is unpleasant to the taste. On the other hand, since the ground remain in the liquid, a point is reached where the coffee concentration is excessive and oils are boiled out having a disagreeable flavor. Thus the quality of pot coffee is difficult to control.

In the drip method, boiling water is poured over the coffee grounds in a double container and the resultant beverage trickles through pores in the upper container to flow into the lower container. While this method produces coffee of good quality, it is cumbersome and slow.

The well known percolator method is somewhat faster, but since in this technique the boiling beverage is recirculated through the coffee grounds, the aromatic oils are volatilized and the resultant beverage is relatively flat.

The filter method is similar to the drip method except that the coffee grounds are deposited in a funnel-shaped paper filter which is permeable only to the beverage. This method is also very slow, for the coffee grounds tend to clog the pores of the filter and there is no pressure existing to accelerate the slow trickle of the beverage through the filter.

It is important to bear in mind that when brewing with continuously boiling water, live steam or recirculating hot water, the aromatic oils are volatilized and the coffee is rendered flat. When brewing with water brought to the point of boiling, the coffee is of far better quality but the brewing process is ordinarily much slower. Hence existing techniques which are slow produce superior coffee and those which are fast produce an inferior beverage.

Accordingly, it is the main object of the invention to provide a coffee maker which quickly and efficiently produces a highly aromatic coffee beverage of superior quality. The significant feature of the invention rests in the fact that the brewing process is accelerated without a concomitant loss of quality.

More specifically, it is an object of the invention to provide a high-speed coffee maker in which a highly concentrated coffee brew is subjected to steam pressure which causes the brew to intermingle with hot water, thereby to afford a beverage of the desired concentration.

Briefly stated, these objects are accomplished in a coffee maker comprising a coffee pot for boiling water, and a float-container receivable telescopically within the pot. The float-container is in the form of a cup having a removable perforated cap adapted to accommodate a filter element. A suitable charge of coffee grounds is deposited in the container cup and boiling water from the pot is poured thereover to provide a concentrated brew.

The filter cap is then attached to the cup and the float-container is placed in inverted position into the pot having the boiling water. Because of the concentrated brew within the inverted container, the container initially tends to sink in the boiling water. However, steam generated in the pot forces its way into the container through the perforated cap and displaces the concentrated brew, which is thereby expressed into the boiling water. As a consequence, the container is rendered buoyant and floats to the surface of the boiling water, at which point the process is completed.

The amount of time necessary to carry out the total process is not much greater than the time necessary to bring the water to the point of boiling, for once this occurs, a portion of the boiling water is decanted from the pot into the container to produce the concentrated brew in no more than about a minute, after which the container is placed in the pot to effect transfer of the brew into the water, which action occurs in no more than about a minute. It will be appreciated, therefore, that the total processing time is relatively brief as compared to any existing coffee brewing technique.

For a better understanding of the invention as well as other objects and further features thereof, reference is made to the following detailed description to be read in conjunction with the accompanying drawing, wherein:

FIG. 1 shows the coffee pot in perspective;
FIG. 2 is an exploded view of the float-container to be received in the pot;
FIG. 3 shows the first step in carrying out the coffee making process;
FIG. 4 shows the second step;
FIG. 5 shows the third step; and
FIG. 6 illustrates in section the fourth and final step.

Referring now to the drawings and more particularly to FIGS. 1 and 2, the basic elements of a coffee maker in accordance with the invention are a pot 10 for boiling water and a float-container constituted by a cup 11, a cap 12 therefor, and a filter element 13.

Pot 10 may be of any suitable metallic or high temperature glass design having a spout 14 and a handle 15. The pot is intended as a boiler for water and is dimensioned telescopically to receive the float container. The cup 11 is cylindrical in form and preferably metallic. In practice it may be made of light weight aluminum. The mouth of the cup is suitably threaded to receive a similarly threaded cap. Alternatively, a snap on connection may be used. Cap 12 is of perforated construction to permit the flow of liquid therethrough. Accommodated within the cap is the filter element 13 which is preferably of porous paper. The filter is replaced after each operation. A reusable cloth may also be used.

To make coffee with this assembly, the pot is filled with water and as shown in step 1, it is placed on a suitable electric or gas heater to bring the water to a boil. We shall assume by way of example that the pot is dimensioned to hold four cups of water with a view to making a similar amount of beverage. Into the cup 11 a charge of coffee grounds is deposited sufficient for four cups of coffee. Then when the water in the pot is at the boiling point, about one cup thereof is poured over the grounds in the container as shown in step 2 to produce a concentrated brew of coffee. The filter 13 is placed within the cap 12 and the cap is then screwed over the container 11.

As shown in step 3, the capped container having the concentrated brew therein is inverted into the remaining boiling water in the pot. The heat under the pot is maintained for a few seconds until such time as the float-container rises, as explained below.

At the outset, the inverted container having the concentrated brew therein, as shown in step 4 tends to sink in the boiling water in the pot. However, steam generated in this water is entrapped by the container, as a result of which the brew is forced through the pores of the cap and filter into the container. The reason for this is that the steam creates a pressure within the container which acts to expel the brew concentrate therefrom, causing the concentrate to flow into the water in the pot.

With the expulsion of the concentrate, the steam-filled container is rendered buoyant and the container then floats to the top of the water in the pot. The bottom of the cup, which is inverted in the pot, is provided with a small hinged handle 16 to facilitate insertion and removal of the container. The concentrate, when added to the hot water, provides a beverage of the proper concentration and the coffee may now be served.

The actual amount of time consumed in carrying out the various steps outlined above is relatively brief, for once the water is brought to a boil, the extraction of the concentrate from the coffee grounds in the container takes place very quickly and the expulsion of the concentrate from the container is expedited by steam pressure.

While there has been shown what is considered to be a preferred embodiment of the invention, many changes may be made therein without departing from the spirit thereof as set forth in the annexed claims.

What I claim is:

1. A coffee-maker comprising a generally cylindrical pot for boiling water, and a generally cylindrical float container telescopically receivable within said pot, said container being constituted by a cup into which a charge of coffee grounds may be placed to be brewed with boiling water taken from said pot to produce a concentrate, a removable perforated cap for said cup and a porous filter element receivable within said cap over the perforations therein to render said cup permeable to liquid and gas only through the pores of the filter element in the cap, the cup being otherwise sealed, whereby when the container is inverted in said pot, steam from said boiling water therein enters said cup and expels the concentrate therefrom to cause said container to float.

2. A coffee-maker as set forth in claim 1 wherein the bottom of said cup is provided with a handle to facilitate removal of said container from said pot.

3. A coffee-maker as set forth in claim 1 wherein said pot is of high temperature glass and said container is made of aluminum.

References Cited

UNITED STATES PATENTS

| | | | |
|---|---|---|---|
| 648,545 | 5/1900 | Adams | 99—320 X |
| 2,224,672 | 12/1940 | Davis | 99—320 X |
| 2,814,245 | 11/1957 | Courtney | 99—323 |
| 3,034,418 | 5/1962 | Bunn | 99—323 |

WALTER A. SCHEEL, *Primary Examiner.*

S. P. FISHER, *Assistant Examiner.*